Aug. 13, 1968     E. R. METZKER ETAL     3,397,357
INDUCTIVE DEVICE FOR CENTERING A PUNCH WITHIN ITS DIE
Filed July 6, 1964
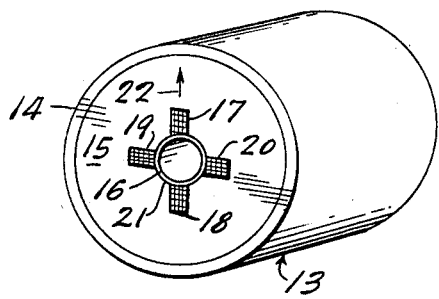
FIG-1-
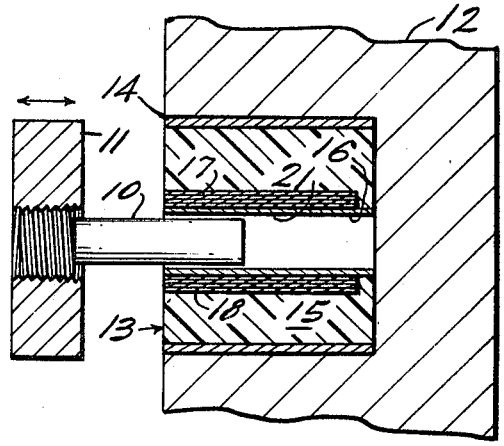
FIG-2-
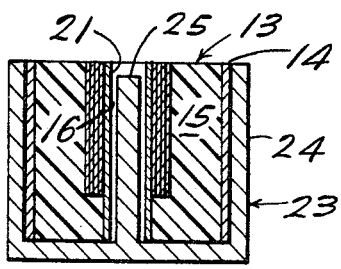
FIG-3-
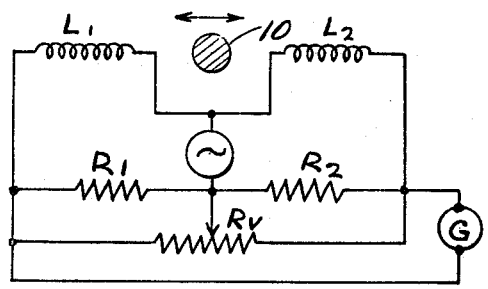
FIG-4-
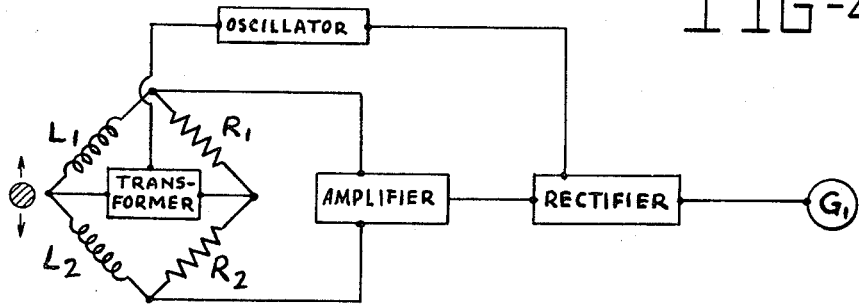
FIG-5-
INVENTORS:
EDWARD R. METZKER,
SAM J. GREEN.
BY
ATT'YS.

United States Patent Office

3,397,357
Patented Aug. 13, 1968

3,397,357
INDUCTIVE DEVICE FOR CENTERING A PUNCH WITHIN ITS DIE
Edward R. Metzker, Oregon, and Sam J. Green, Temperance, Mich., assignors to Champion Spark Plug Company, Toledo, Ohio, a corporation of Delaware
Continuation of application Ser. No. 380,563, July 6, 1964. This application Oct. 2, 1967, Ser. No. 672,400
1 Claim. (Cl. 324—34)

ABSTRACT OF THE DISCLOSURE

A punch centering device for indicating when a punch is aligned with its die. The device includes an annular housing adapted to fit into the die cavity and having a central passage which will receive the punch. The housing contains two balanced inductors spaced equidistant from and on opposite sides of the desired path for the punch and connected to two legs of a balanced bridge circuit. When the punch is off-center, the impedences of the two inductors are unequal and the bridge circuit is unbalanced. The unbalanced bridge circuit is electrically detected and indicated. Two pairs of opposed inductors can be mounted perpendicular to each other to indicate centering in two directions.

---

This is a continuation of application Ser. No. 380,563 filed July 6, 1964.

This invention relates to a centering device for use with a machine tool such as a punch press, drawing press or extrusion press wherein matching members, such as a male punch and female die, must be accurately aligned to insure proper operation.

The present invention is particularly useful and will be illustrated as embodied in a reciprocating punch press wherein the male punch member moves in and out of registry with a fixed female die member. In many such machines, the movable male member, which is reciprocated back and forth hydraulically or by a mechanical driven means, is provided with adjusting means to align its axis of reciprocation with the axis of the fixed female die member. In many such automatic presses, the punch and die members themselves are interchangeable so that the machine may perform a number of various operations. When the punch and die members are changed for a production changeover, or when one of these members is replaced due to wear or damage, etc., it is usually necessary to align the movable member relative to its desired axis of reciprocation in order that it perfectly registers with the fixed member. Because punch, drawing and extrusion presses of this type are usually operated with great force, it has been heretofore necessary to reciprocate the movable member by hand prior to obtaining its proper alignment with the fixed member because the operating clearance between the punch and die is often very small. Furthermore, accurate alignment of the two members by visual or mechanical measuring means is often very difficult, due to the fact that in large automatic presses, the punch and die members themselves may be located in a remote position within the machine.

Accordingly, it is an object of this invention to provide a tool centering device for indicating the position of a movable tool relative to its desired axis of operation.

It is another object of this invention to provide a device for accurately indicating the position of a movable tool relative to its desired axis of operation which device may be temporarily inserted within or upon the fixed tool bed in the place of the matching die member and which will remotely indicate the position of the reciprocating tool relative to the device and the fixed die bed.

It is still another object of this invention to provide a tool positioning device which may be used to locate the position of a reciprocating tool member relative to its desired axis of operation and which is capable of indicating the position of said tool to a degree of accuracy heretofore unattainable by visual or mechanical measuring means.

It is yet another object of this invention to provide a tool centering device as described which may be interchangeably used with a number of similar punch or extrusion press machines of similar design and which is capable of indicating the position of a number of interchangeable reciprocating tool members.

Other objects and advantages of this invention will be more apparent from the following specification and drawing in which:

FIGURE 1 is a view in perspective of the cylindrical coil housing of the tool centering device of this invention as it is illustrated to be used with a reciprocating punch press.

FIGURE 2 is a schematic cross sectional view of a reciprocating punch press in which the coil housing of this invention is shown within a die button recess in a die section;

FIGURE 3 is a vertical cross sectional view of the coil housing shown in FIGURE 1 placed within a prealignment jig, the purpose of which is fully explained below;

FIGURE 4 is a schematic circuit diagram showing the circuitry connecting a pair of electromagnetic coils contained within the coil housing of FIGURE 1 connected with means for visually indicating the tool position; and FIGURE 5 is a block diagram showing the components and circuitry connecting one pair of coils located in the coil housing of FIGURE 1 with means for indicating the tool position.

Referring first to FIGURE 2, a removable punch 10 threaded into a reciprocating punch platen 11 is shown associated with a fixed die block 12, only a portion of which is shown. A cylindrical coil housing, generally indicated by reference numeral 13, is shown within the cavity in the die block 12 which normally houses the female die button or die insert. The cylindrical coil housing 13, as shown in FIGURE 1, has the same outside dimensions as the die button or die insert so that it snugly seats within the die block 12.

The coil housing, as clearly seen in FIGURE 1, includes an outer annular shell 14 which is circumjacent an inner annular core 15. A central aperture 16 extends axially throughout the coil housing 13. Embedded within the core 15 and adjacent to the central aperture 16 are two pairs of inductance coils, 17, 18 and 19, 20. Each of these coils 17 through 20 extend parallel to the axis of the coil housing 13 and substantially throughout its length, as shown in FIGURES 2 and 3. The first pair of coils 17, 18 is positioned at right angles to the second pair 19, 20, as shown in FIGURE 1.

Because the coil housing 13 is to be inserted and withdrawn within the cavity of the die block 12 each time the punch 10 is to be aligned, it is preferable to fabricate the outer shell 14 of a wear and impact resistant material such as hardened steel. The inner core 15 may be fabricated from any material capable of precisely and firmly holding the coils 17 through 20 in position, as shown in FIGURE 1. In the preferred embodiment shown in FIGURE 1, an annular sleeve 21 is provided as a liner for the central aperture 16, and also serves to hold the coils 17 through 20 in place and prevent damage to the coils from abrasion or impact by the punch 10. The sleeve 21 also should be fabricated from a nonmagnetic material so as to not interfere with the electrical characteristics of the coils 17 through 20 as explained below.

When the entire coil housing is installed within the cavity in the die block 12, as shown in FIGURE 2, the inside diameter of the central aperture 16 or sleeve 21, which is substantially larger than the diameter of the punch 10, will easily admit the body of the punch 10 as it reciprocates back and forth with the platen 11.

In the normal operation of a punch or extrusion press, the male member of the punch must be aligned within several thousandths of an inch relative to the female member or die. Such adjustments are effected upon the male member in an up and down direction, as shown in FIGURE 2, or in a direction normal to the plane of the drawing of FIGURE 2. The inner diameter of the central aperture 16 or the sleeve 21 is large enough to provide sufficient clearance so that the punch 10 may enter when the punch is out of alignment. Therefore, unless the punch 10 has been badly bent and pushed far out of alignment, it is not necessary to reposition the punch 10 and platen 11 relative to the coil housing 13 prior to bringing the punch 10 and platen 11 toward the coil housing 13 and die block 12.

The operation of the punch centering device of this invention may be readily understood by reference to FIGURE 4. FIGURE 4 is a schematic circuit diagram showing the connections of one pair of the coils, 17, 18, or 19, 20. This pair of coils, designated L1 and L2 in FIGURE 4, is connected with a pair of fixed resistances R1 and R2 to form an A.C. bridge circuit. A source of alternating current is connected between the junction of L1 and L2 and the junction of R1 and R2. A current indicating device, such as an A.C., zero center galvanometer, G, is connected across the junctions of L1, R1 and L2, R2 respectively. The parameters of L1, L2, R1 and R2 are selected such that when the male member is centered equidistant between coils L1 and L2, it is in balance and there is no current flow through the galvanometer G. A variable resistance $R_v$ is connected in parallel with fixed resistances R1 and R2 which may be used to initially adjust the system to compensate for any differences in total impedance between L1 and R1 and L2 and R2 when the punch 10 is centered.

When the coils L1 and L2 are positioned opposite each other and equidistant from the central axis of the coil housing 13 which coincides with the desired axis of reciprocation of the punch 10, when the punch 10 is properly aligned so that it coincides with its desired axis of reciprocation, and when $R_v$ is properly adjusted, there is no current flow through the galvanometer G. In this condition, the punch 10, schematically shown in FIGURE 4, is in the physical and electrical center of the two coils L1 and L2. However, when the punch 10 is not properly aligned, it will be closer to one coil and therefore the effective impedance of the coils L1 and L2 will be different due to a change in inductive reactance of the coils L1 and L2 caused by a change in coil permeability. As is well known to persons skilled in the art, a difference in the effective impedance in one leg of the bridge circuit shown in FIGURE 4 will cause current to flow which will be indicated on the A.C. zero center galvanometer, G.

The second pair of coils, 19, 20, is connected in a similar manner as the first pair of coils 17, 18 and is positioned at right angles to the first pair of coils, 17, 18 so that the second pair of coils 19, 20 will indicate the alignment or misalignment of the punch 10 in a direction normal to a direction indicated by the first pair of coils 17, 18. FIGURE 4 illustrates a bridge circuit connected to one set of coils, and it will be understood that the other set of coils will be connected by an identical bridge circuit. Each bridge circuit may have separate current indicating means such as the zero center galvanometer, or there may be a single current indicating means which may be selectively connected to the bridge circuits.

As previously explained, the current indicating means may be remotely located from the coils 17 through 20 within the coil housing 13 so that it may be read from a position convenient to the person aligning the punch or extrusion press. The current indicating means, such as a zero center galvanometer, may be calibrated to indicate the distance in either direction which the punch 10 is out of alignment with its desired axis of reciprocation. An appropriate bench mark 22, shown in FIGURE 1, may be placed on the face of the coil housing 13 to insure its installation within the die block 12 in the same relative position so that the galvanometer may be calibrated to indicate the direction and amount of misalignment of the punch.

FIGURE 3 shows the coil housing 13 installed within a prealignment jig 23 which may be used to calibrate the punch centering device of this invention. The prealignment jig 23 comprises an annular hollow member 24 having a central axial shaft 25. The internal diameter of the annular hollow member 24 is identical to the internal diameter of the cavity in the die block 12 and the axis of the shaft 25 corresponds to the central axis of the die button or die section and the desired axis of reciprocation of the punch member 10. When the coil housing 13 is installed within the prealignment jig 23, as shown in FIGURE 3, the shaft 25 is at the exact physical and electrical center of each of the pairs of coils 17, 18 and 19, 20. With the coil housing 13 so positioned in the prealignment jig 23, the operator adjusts the variable resistance $R_v$ (shown schematically in FIG. 4) so that the zero center galvanometer G reads zero current for both sets of coils. After this prealignment step has been done, the tool centering device of this invention is ready to be used in aligning the punch 10 on a punch or extrusion press as previously explained. It is also possible, through adjustment of the variable resistor $R_v$, to balance the bridge circuit when the central shaft 25 in the prealignment jig 23 is slightly off center. When so adjusted, the glavanometer would read zero when the punch 10 is off center by an equal amount when the coil housing is installed in the die block 12.

FIGURE 5 is a block diagram of components in an improved circuit associated with one pair of the coils within the coil housing 13. As will be readily understood by a person of skill in this art, an oscillator provides a signal to an isolating transformer connected across the junctions of L1, L2 and R1, R2. When the bridge circuit is out of balance due to misalignment of the punch 10 and, therefore, a difference in total impedance in the legs of the bridge is present, the current flow within the bridge is detected by the amplifier which in turn sends an amplified signal to a phase sensitive rectifier which compares this signal to that of the oscillator. The resulting D.C. signal is indicated by the galvanometer $G_1$ connected thereto. As in the case of the circuit schematically shown in FIGURE 4, each of the two pairs of coils, 17, 18 and 19, 20 are provided with their own respective bridge circuits and are either selectively connected to a single current indicating means such as the galvanometer or have their own separate current indicating means.

Due to the relatively high sensitivity of an A.C. bridge circuit, as disclosed in FIGURES 4 and 5, to changes in the effective impedance of the coils L1 and L2, it has been found that punch alignment within less than one one-thousandth of an inch is possible through use of the device of this invention. Furthermore, because the device is compact and rugged and because the current indicating means may be remotely located from the coil housing 13 which must be inserted within the die block 12, it has been found that punch alignment is more convenient and faster than was possible with previous methods of visual or mechanical measurement. Use of the device of this invention has reduced the amount of damage to punches and die buttons or sections due to damage caused by trial and error methods. It has also proven to be economical due to the speed and convenience with which a punch or plunger of an extrusion press may be accurately aligned.

Although the preferred embodiment of my invention has been described for use in conjunction with a reciprocating punch and matching die member, it will be apparent to one of ordinary skill in the art that such a device may be adapted, with obvious variations in the size and type of the coil housing 13, for use in aligning any type of punching, stamping, extruding or blanking operation where accurate alignment of interfitting male and female members is necessary for proper operation.

Having described the preferred embodiment of our invention, we claim:

1. A measuring device for indicating the displacement of a male punch from its desired axis within a complementary shaped female die button, said device comprising, in combination, an annular body having an external shell with outside dimensions the same as said die button whereby said annular body may be received by the die button cavity within the die block, an inner sleeve coaxially positioned within said external shell and having a central passage extending therethrough of sufficient diameter to receive said male punch when displaced at its maximum axial displacement, an intermediate non-magnetic annular layer between said outer shell and said inner sleeve, first and second pairs of identical inductance coils, means for positioning the four coils of said first and second pairs in said intermediate layer, said coils being spaced around said inner sleeve and equidistant from the axis of said central passage, said first pair of coils lying in a plane containing said axis, said second pair of coils lying in a plane containing said axis and perpendicular to the plane of said first pair, a first bridge circuit comprising a first pair of identical and adjacent impedances and the two coils of said first pair of identical inductance coils, a second bridge circuit comprising a second pair of identical and adjacent impedances and the two coils of said second pair of identical inductance coils, an oscillator, means for connecting said oscillator across the diagonal of said first bridge circuit which extends from between said first pair of adjacent impedances to between said first coils, means for connecting said oscillator across the diagonal of said second bridge circuit which extends from between said second pair of adjacent impedances to between said second coils, means for indicating magnitude and direction of axial displacement of said male punch by measuring the magnitude and the polarity of the voltage across either the other diagonal of said first bridge circuit or across the other diagonal of said second bridge circuit, and means for selectively connecting said indicating means to either the other diagonal of said first bridge circuit or the other diagonal of said second bridge circuit.

References Cited

FOREIGN PATENTS

| | | |
|---|---|---|
| 574,618 | 1/1946 | Great Britain. |
| 729,884 | 5/1955 | Great Britain. |
| 666,898 | 2/1952 | Great Britain. |
| 862,320 | 3/1961 | Great Britain. |

OTHER REFERENCES

McMasters, R. C.: Non-Destructive Testing Handbook; vol. II, New York, The Ronald Press, 1963 pp. 54.21–54.22.

RUDOLPH V. ROLINEC, *Primary Examiner.*

R. J. CORCORAN, *Assistant Examiner.*